United States Patent
Reeder et al.

(10) Patent No.: US 10,142,486 B1
(45) Date of Patent: Nov. 27, 2018

(54) TRANSPARENT CONTACT TRANSFER SYSTEM

(71) Applicant: Amazon Technologies, Inc., Seattle, WA (US)

(72) Inventors: Melissa Nicole Reeder, Seattle, WA (US); Brian Kropf, Lake Forest Park, WA (US); Nancy Shields, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/699,835

(22) Filed: Sep. 8, 2017

(51) Int. Cl.
*H04M 3/58* (2006.01)
*H04M 3/42* (2006.01)

(52) U.S. Cl.
CPC ......... *H04M 3/58* (2013.01); *H04M 3/42144* (2013.01)

(58) Field of Classification Search
CPC ........ H04M 3/58; H04M 3/5233; H04M 3/51; H04M 3/54
USPC ...... 379/212.01, 264, 265.05, 266.1, 265.11, 379/265.12, 242, 273
See application file for complete search history.

(56) References Cited

U.S. PATENT DOCUMENTS

| 2006/0182252 A1* | 8/2006 | Harris | H04M 3/51 379/211.01 |
| 2006/0203994 A1* | 9/2006 | Shaffer | H04M 3/51 379/266.01 |

* cited by examiner

*Primary Examiner* — Thjuan K Addy
(74) *Attorney, Agent, or Firm* — Knobbe, Martens, Olson & Bear, LLP

(57) ABSTRACT

A centralized system is provided for managing customer contacts in a customer service center and transferring those contacts between agents in a transparent manner. When an agent determines that a different representative is more likely or capable of resolving an issue associated with a customer contact, the system facilitates the transfer of the contact to another agent. The transfer can be transparent to both the sending agent and receiving agent so that both agents are informed in real time, via a dynamic user interface, regarding the status of the transfer of the current contact. In some embodiments, the transfer may not be limited to only transferring actual communication with the customer to the receiving agent, but may be an integrated process that includes the transfer of records, assignments, and other data-driven associations from the sending agent to the receiving agent.

20 Claims, 7 Drawing Sheets

TRANSPARENT CONTACT TRANSFER SYSTEM

BACKGROUND

Customer service centers, such as call centers, provide a centralized mechanism to handle a customer contacts across a variety of contexts. For example, customer service centers may be used to handle contacts relating to sales and marketing, technical support, and billing. In a common scenario, a customer service center for a large enterprise may handle customer service calls and other communications regarding a large number of issues related to disparate products and services. To provide service for the different types of issues that can arise across the disparate products and services, the customer service center may use searchable databases of issue resolution procedures. A customer service representative can obtain details regarding an issue, such as by following a script of questions. The details provided to the customer service representative can then be used to search the database and obtain a resolution for the issue.

Some customer service centers use distinct groups or "nodes" of customer service representatives. Customer service representatives in individual groups are specifically trained to handle particular issues, or to deal with issues for particular products or services. When a customer contact is received, the contact can be routed to a group of customer service representatives trained to handle the issue that the customer is experiencing. If the initial routing is incorrect, or if it is otherwise determined that another group of customer service representatives is more likely to resolve the customer's issue in an efficient and satisfactory manner, the contact can be transferred to the group of customer service representatives that is more likely to resolve the customer's issue.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
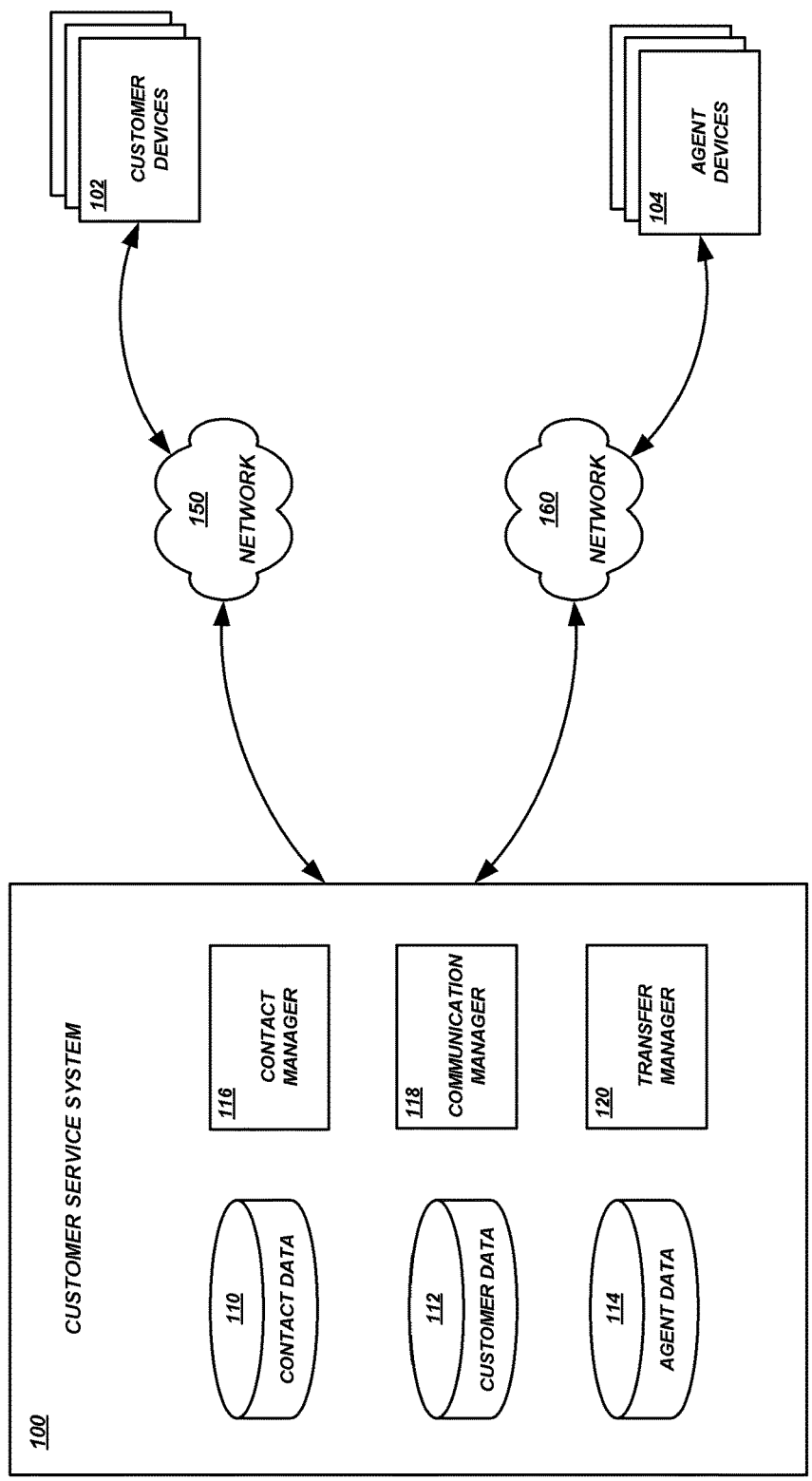
FIG. 1 is a block diagram of an illustrative computing environment including a customer service center, various customer devices, and various agent devices according to some embodiments.

The present disclosure is directed to a system that manages customer contacts in a customer service center and transfers those contacts between customer service representatives in a transparent manner. The system facilitates the assignment of a customer contact (e.g., phone call, instant message conversation, etc.) to a particular customer service representative, also referred to as an "agent." After the agent determines that a different agent is more likely or capable of resolving an issue associated with the customer contact, the system facilitates the transfer of the contact to the other agent. Advantageously, the transfer can be transparent to both the sending agent and receiving agent so that both agents are informed in real time, via a dynamic user interface, regarding the status of the transfer of the current contact. In some embodiments, the transfer may not be limited to only transferring actual communication with the customer to the receiving agent (e.g., transferring the phone call, instant message conversation, etc.). The transfer process may be an integrated process that includes the transfer of records, assignments, and other data-driven associations from the sending agent to the receiving agent. This integrated transfer allows post-contact processes to be properly associated with the receiving agent, and frees up the sending agent to accept another contact.

Generally described, a customer contact, also referred to herein as a "contact" for convenience, may be any conversation or other communication related to an issue, question, or other topic of interest. The contact may be initiated by, received from, or otherwise include communication with a customer or other entity. The contact may take any of a variety of forms. For example, a contact may include a telephone conversation initiated by a customer regarding an issue with a product. As another example, a contact may include an instant message conversation or "chat" with a potential customer, whether initiated by the customer or the customer service system. As a further example, a contact may include an email or text message from a customer posing a question about a topic. These example contacts are illustrative only, and are not intended to be limiting. In some embodiments, a customer service system may deal with any or all of these contacts, other types of contacts, some combination thereof, etc.

Some conventional customer service systems attempt to assign customer contacts to an appropriate agent who is specifically trained to resolve the customer contact in a satisfactory manner. If that agent determines that a different agent (e.g., one trained to handle different issues) is more likely to resolve the issue successfully, the contact may be transferred. However, such systems typically require a sending agent to research which agents are proper recipients or "targets" for transfer. This research may be a time-consuming process that is particularly undesirable when the agent is communicating with the associated customer in real time, such as during a phone call. In addition, once an agent has been identified to receive the contact, the communication between the sending agent and receiving agent may be quite limited. For example, the communication may include a brief phone conversation between agents before a customer phone call is connected to the receiving agent and disconnected from the sending agent. Therefore, the sending agent may not necessarily know if or when the receiving agent has actually taken over responsibility for the contact, and if or when the corresponding data-driven associations between the contact and the transferring customer service agent can be transferred to the receiving agent.

Aspects of the present disclosure relate to transferring contacts between agents in a transparent manner such that the agents are each provided with information regarding the status of the transfer. In some embodiments, both the sending agent and receiving agent are presented with a dynamic user interface that provides information about the state of the transfer process in real time or substantially real time. By providing information to both agents in real time, the agents can determine whether to proceed with the transfer, how to proceed with the transfer, and when the transfer has been completed. For example, the user interface for the sending agent can present status information indicating that the transfer process is currently waiting for the receiving agent to agree to accept the transfer. The user interface for the receiving agent can prompt the receiving agent to accept the transfer. Upon acceptance of the transfer by the receiving agent, the user interface of the sending agent can dynamically change to enable the sending agent to complete the transfer (e.g., a button or other option can be shown or enabled). Upon activation by the sending agent of the option to complete the transfer, the contact is transferred to receiving agent. Thus, the sending agent can be assured that the transfer of the contact has been accepted by the receiving agent, and that once the sending agent completes the transfer (e.g., activates the option that has been enabled), the transfer will be complete. Upon completion of the transfer, the dynamic user interfaces for both transferring and receiving agent can be updated to show that the contact is now with the receiving agent. There will be no need for the sending agent to follow up with the receiving agent, with the customer, or with the system to verify that the contact has been successfully transferred.

Additional aspects of the disclosure relate to integrating the transfer of underlying data associations or "locks" along with the transfer of the actual customer communication. In some embodiments, an agent may be locked to a contact until the contact is resolved. For example, if communication with a customer is occurring via a telephone call, the agent may be prevented from handling any other contact for the duration of telephone call. In addition, the agent may be associated with the contact for purposes of conducting various post-resolution processing, such as providing and receiving feedback, performing follow-up communications, etc. In some conventional systems, the sending agent and/or receiving agent must perform additional operations to complete the transfer of such underlying data associations from the sending agent to the receiving agent. However, by integrating the automatic transfer of such underlying data associations with the transfer of the customer communication for the contact, the process of transferring a contact can be streamlined and completed with a higher degree of consistency than existing multi-step manual processes.

Although aspects of some embodiments described in the disclosure will focus, for the purpose of illustration, on particular examples of contacts, modes of communication, and underlying data associations, the examples are illustrative only and are not intended to be limiting. In some embodiments, the techniques described herein may be applied to additional or alternative contacts, modes of communication, and underlying data associations. Various aspects of the disclosure will now be described with regard to certain examples and embodiments, which are intended to illustrate but not limit the disclosure.

Network-Based Customer Service Environment

With reference to an illustrative embodiment, FIG. 1 shows a network environment in which aspects of the present disclosure may be implemented. As shown, the network environment may include a customer service system 100, various customer devices 102, and various agent devices 104. The customer devices 102 and agent devices 104 may communicate with the customer service system 100 and/or each other via one or more communication networks, such as communication networks 150 and 160. The communication networks are also referred to herein as "networks" for convenience.

In some embodiments (e.g., when a customer device 102 is a telephone), network 150 may be a circuit-switched network or other telephone network. For example, network 150 may be a publicly-accessible telephone network, such as the public switched telephone network ("PSTN") or a cellular telephone network. In these embodiments, network 150 may be referred to as a "phone network" to highlight its use as a network for transmitting telephone communications such as telephone call audio, text messages, and the like. In other embodiments, such as when a customer device 102 is configured to establish telephone calls using voice over IP ("VOIP") or communicate using other computer-based methods (e.g., instant message, email, etc.), then network 150 may be a packet-switched data network. For example, network 150 may be a publicly-accessible network of linked networks, possibly operated by various distinct parties, such as the Internet. In some cases, the network 150 may include a private network, personal area network, local area network, wide area network, cable network, satellite network, cellular data network, etc., or a combination thereof, some or all of which may or may not have access to and/or from the Internet. In these embodiments, network 150 may be referred to as a "data network" to highlight its use as a network for transmitting bit-encoded data.

In some embodiments, network 160 may be or include a phone network and/or a data network, similar to network 150, depending upon the particular agent device 104 or communication method being used for a given contact. Although networks 150 and 160 are shown as separate networks, in some embodiments a single network may be used by both a customer device 102 and agent device 104 to communicate with the customer service system 100 and/or each other.

The customer service system 100 may include various components for providing the features described herein. Illustratively, the customer service system 100 may include a contact data store 110 for storing data regarding current and past contacts, a customer data store 112 for storing data regarding customers associated with past, present, or future contacts, and an agent data store 114 for storing data regarding the agents that handle contacts.

The customer service system 100 may also include a contact manager 116 for managing the process of resolving a contact. For example, the contact manager 116 may receive a communication from a customer device 102, and assign the contact to a particular agent who uses an agent device 104 to communicate with the customer device 102. The contact manager 116 may also establish various data-driven associations between the contact and the assigned agent, track the progress of resolving the contact, and perform post-resolution processing.

The customer service system 100 may also include a communication manager 118 for managing the communication between customer devices 102 and agent devices 104. For example, the communication manager 118 may establish a phone connection between a customer device 102 and an agent device 104 if the contact was initiated via a phone call from the customer device 102. As another example, the communication manager 118 may establish an instant message or "chat" connection between the customer device 102 and agent device 104 if the contact was initiated via a chat session. In some embodiments, a different communication manager 118 may be used for each type of communication. In some embodiments, a plurality of communication managers 118 may be used for load balancing of contact communications.

The customer service system 100 may also include a transfer manager 120 for managing the transfer of contacts between different agents and, therefore, different agent devices 104. For example, the transfer manager may manage the process of a first agent device 104 requesting a transfer of a contact to a second agent device 104, receiving acceptance of the transfer from the second agent device, and then completing the transfer. Illustratively, the transfer manager 120 can instruct the communication manager 118 to connect a phone call to a second agent device 104, even though that phone call had been previously established between a customer device 102 and a first agent device 104. As another example, the transfer manager 120 may instruct the communication manager 118 to connect an instant message or "chat" session to a second agent device 104, even though that chat session had been previously established between a customer device 102 and a first agent device 104. As a further example, the transfer manager 120 may instruct the contact manager 116 regarding transfer, to the second agent device 104, of the underlying data associations or "locks" that tie the contact to the first agent device 104.

The example components and data stores of the customer service system 100 shown in FIG. 1 are illustrative only, and are not intended to be limiting. In some embodiments, a customer service system 100 may have fewer, additional, and/or alternative components and data stores.

The customer service system 100 may be implemented on one or more physical server computing devices that provide computing services and resources to customer devices 102. In some embodiments, the customer service system 100 (or individual components thereof, such as the contact manager 116, communication manager 118, transfer manager 120, etc.) may be implemented on one or more host devices, such as blade servers, midrange computing devices, mainframe computers, desktop computers, or any other computing device configured to provide computing services and resources. For example, a single host device may execute one or more contact managers 116, communication managers 118, transfer managers 120, data stores 110, 112, 114, some combination thereof, etc. The customer service system 100 may include any number of such hosts.

In some embodiments, the features and services provided by the customer service system 100 may be implemented as web services consumable via one or more communication networks. In further embodiments, the customer service system 100 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

The individual customer devices 102 and agent devices 104 may be any of a wide variety of electronic communication devices, including telephones, personal computing devices, terminal computing devices, laptop computing devices, tablet computing devices, electronic reader devices, wearable computing devices, mobile devices (e.g., cellular and other mobile phones, smart phones, media players, handheld gaming devices, etc.), set-top boxes, streaming media devices, smart home appliances, and various other electronic devices and appliances.

In some embodiments, a customer or agent may use a system of multiple devices, rather than a single customer device 102 or agent device 104. For example, a customer may use a telephone to communicate verbally with an agent while also using a tablet computing device to communicate textually, via video, or as the source of the issue that gave rise to the contact. As another example, an agent may use a desktop computer to view information about the customer and how to resolve the issue that gave rise to the contact, while also using a telephone to communicate verbally with the customer.

Example Process for Transparent Transfer of Contacts

Figure 2:
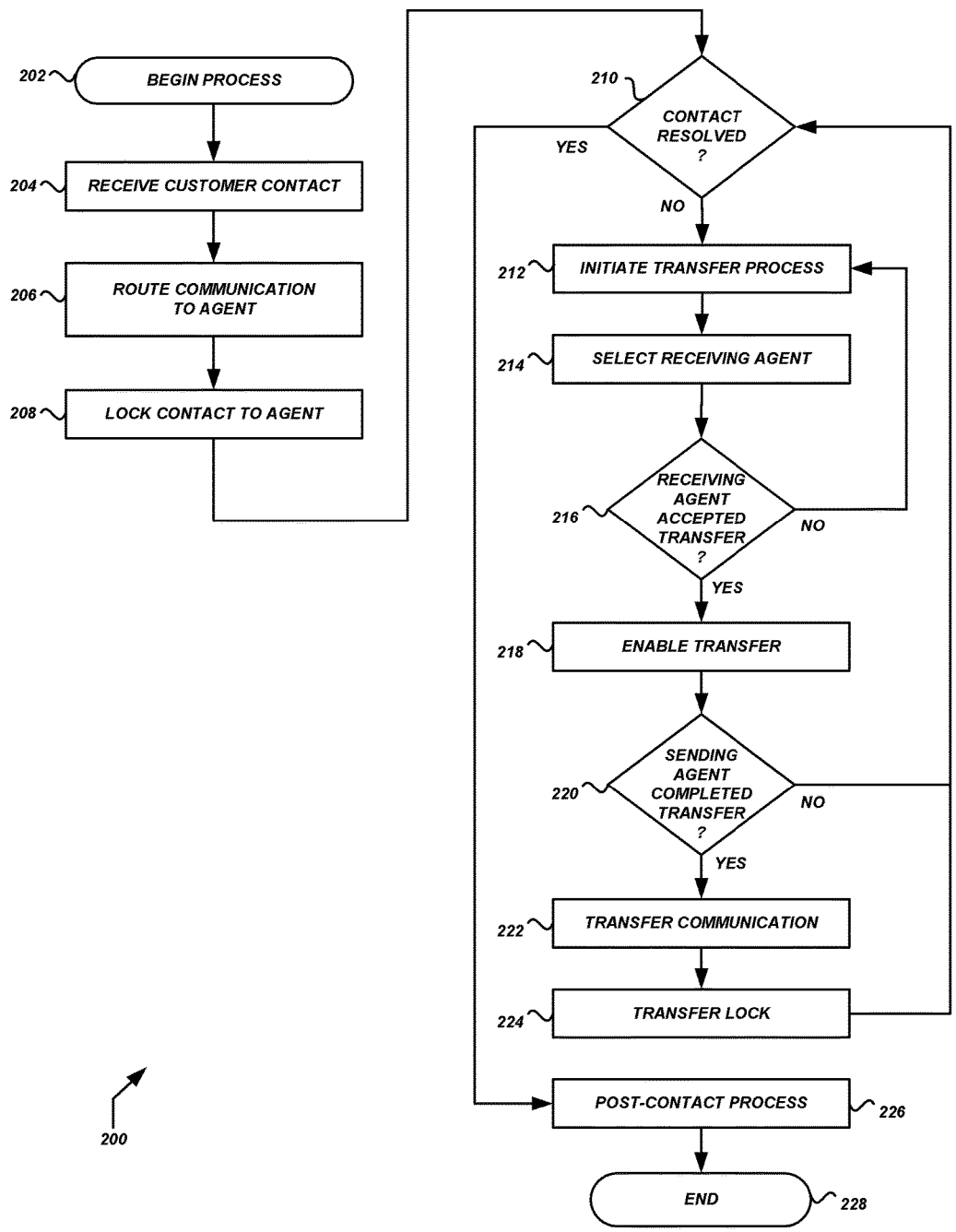
FIG. 2 is a flow diagram of an illustrative process for transparent transfer of customer contacts according to some embodiments.

FIG. 2 is a flow diagram of an illustrative process 200 that may be executed by a customer service system 100 to receive customer contacts from customer devices 102, and to transfer the contacts among various agent devices 104. Portions of the process 200 will be described with reference to the example data flows, interactions, and user interfaces shown in FIGS. 3, 4, 5, and 6. FIGS. 3-6 show simplified versions of the network environment illustrated in FIG. 1, and omit the networks and various other elements for clarity and convenience.

The process 200 shown in FIG. 2 begins at block 202. The process 200 may begin in response to an event, such as when the customer service system 100 begins operation, connects with an agent device 104, or receives initiation of a customer contact from a customer device 102. When the process 200 is initiated, a set of executable program instructions stored on one or more non-transitory computer-readable media (e.g., hard drive, flash memory, removable media, etc.) may be loaded into memory (e.g., random access memory or "RAM") of a computing device, such as the computing device 700 shown in FIG. 7 and described in greater detail below. For example, executable instructions for implementing the functionality of the contact manager 116, communication manager 118, and/or transfer manager 120 may be loaded into memory and executed by a processor. In some embodiments, the process 200 or portions thereof may be implemented on multiple processors, serially or in parallel.

At block 204, the contact manager 116 or some other module or component of the customer service system 100 can receive a contact from a customer device 102. For example, a customer may have an issue with a particular product, and the customer may use a telephone to call a phone number associated with the customer service system 100. The contact manager 116 can receive the phone call or be notified of receipt of the phone call.

At block 206, the contact manager 116 or some other module or component of the customer service system 100 can initiate routing of the phone call to an agent device 104 operated by or associated with an agent selected to handle the contact. Illustratively, the agent may be selected based on an expertise in the subject area of the issue that gave rise to the contact, an availability of the agent, a positive contact resolution history with the particular customer from whom the contact has been received, some other criteria, or some combination thereof. In some embodiments, the contact manager 116 may instruct the communication manager 118 to connect the phone call to the agent device 104. For example, the phone call may be routed through a private branch exchange ("PBX") associated with the customer service system 100, forwarded as a voice over IP ("VOIP") call to the agent device 104, or the like. If the contact included a different type of communication (e.g., an instant message or "chat" session, a text message, an email, or the like), the appropriate communication forwarding operation could be performed.

Figure 3:
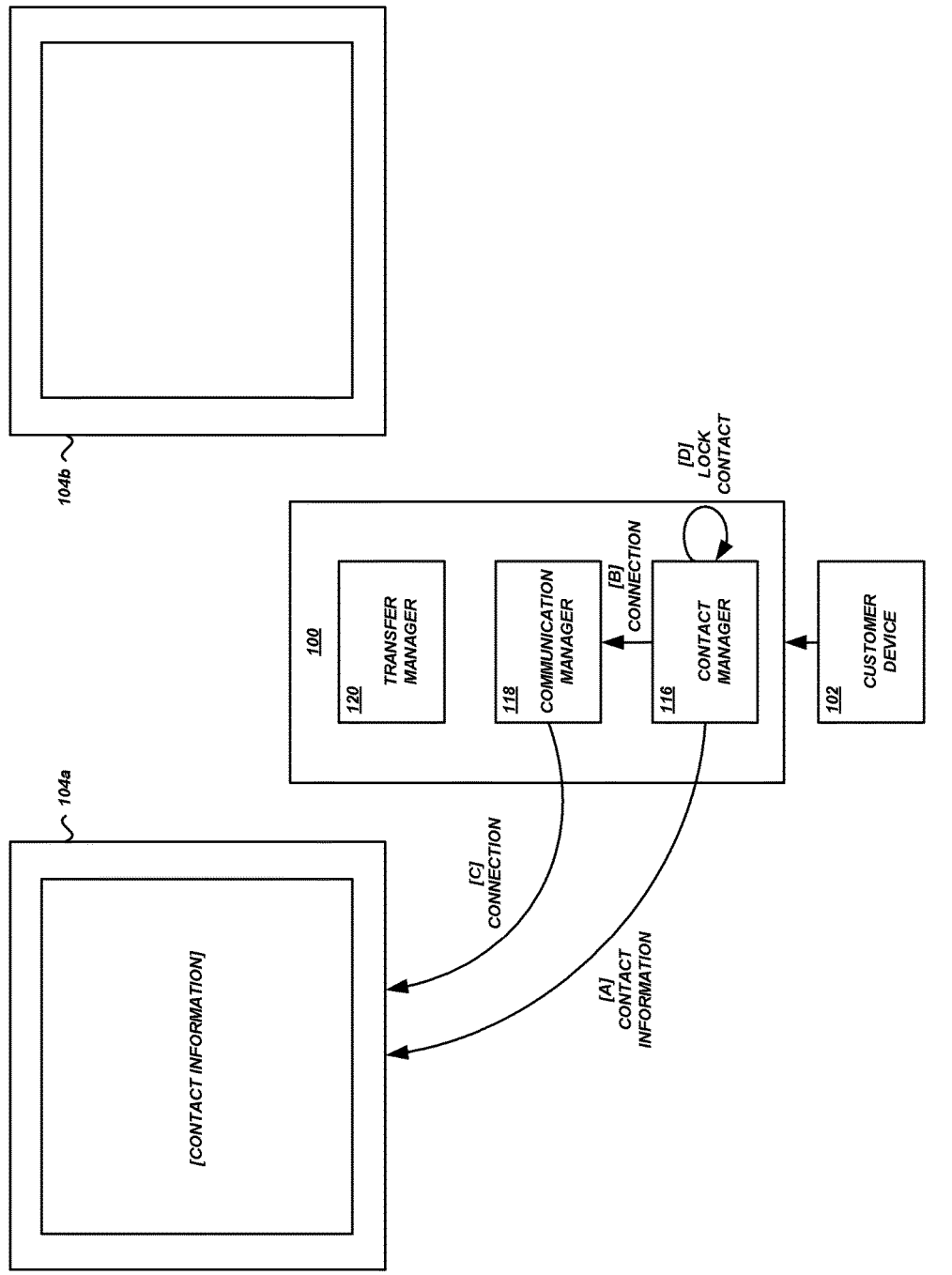
FIG. 3 is a block diagram of various data flows and interactions between components of a customer service cent, an agent device, and a customer device during initiation of a customer contact according to some embodiments.

FIG. 3 shows an example agent device 104a communicating with a customer device 102. As shown, the contact manager 116 has communicated information about the contact to the agent device 104a at [A]. The contact manager 116 has also instructed the communication manager 118 to connect the phone call to the agent device 104a at [B], and the communication manager 118 has made the connection at [C].

Returning to FIG. 2, at block 208 the contact manager 116 or some other module or component of the customer service system 100 can generate or update underlying data to associate or "lock" the contact to the selected agent. When a contact is locked to a particular agent, certain restrictions on the agent's current availability may be implemented, certain post-resolution processes can be required of or associated with the agent, etc. For example, the agent locked to a particular contact may be required to perform certain follow-up communications to verify customer satisfaction, or customer feedback regarding the contact may be tied to the agent for performance review consideration. As another example, the agent may not be permitted to accept other synchronous contacts until a resolution to the current contact has been reached, etc. Synchronous contacts include those in which the method of communicating with the customer device 102 is one in which the customer typically waits for a response before doing anything, such as phone call or, in some cases instant message conversations. In contrast, asynchronous contacts include those in which the customer does not typically stop to wait for an immediate or imminent response, such as emails, text messages, and the like. In some embodiments, the contact may be locked to the agent by generating data, stored in the contacts data store 110 and/or agents data store 114, that indicates the agent has been assigned to the contact, that subsequent feedback associated with the contact is to be associated with the agent, that the agent is not available to accept other synchronous contacts until a resolution to the current contact has been reached, etc. FIG. 3 illustrates the contact manager 116 locking the contact to the agent device 104a at [D].

At decision block 210, the contact manager 116 or some other module or component of the customer service system 100 can determine whether the issue that gave rise to the contact has been resolved, or whether the contact has otherwise concluded. If the contact has concluded, the process 200 can proceed to block 226 for post-contact processing (e.g., follow-up communications, solicitation of feedback, reporting, etc.). Otherwise, if the issue has not been resolved or the contact cannot otherwise be concluded in a satisfactory way, the process 200 can proceed to block 212 to transfer the contact to another agent. For example, the contact may be from a customer who is having an issue with a particular product. The customer may have contacted a general customer support number and been assigned to the first available agent, or the contact may have been initially assigned to the current agent based on an incomplete or erroneous description of the issue. In discussing the issue with the customer, the initially selected agent may determine that another agent may be in a better position to resolve the issue (e.g., the current issue is related to streaming video, but the currently-assigned agent specializes in clothing sales). In this case, the agent may inform the contact manager 116 that a transfer of the contact to another agent is appropriate.

At block 212, the transfer manager 120 or some other module or component of the customer service system 100 can initiate the transfer process. In some embodiments, the transfer manager 120 may provide an interface with which the currently assigned agent, also referred to as the sending agent, may select a group of agents that may include another agent, also referred to as the receiving agent, trained to handle the current contact or otherwise in a better position to resolve the contact in a satisfactory manner. Illustratively, the interface may be a graphical user interface ("GUI"), such as a web page generated by a web server and displayed by the agent device of the sending agent. As described below, FIG. 4 illustrates an example interface 400 that the sending agent can use to initiate transfer of a contact to a receiving agent.

Some customer service systems group agents according to skills or areas of expertise. The groups may then be assigned their own unique name or other identifier. However, the particular identifiers may not convey the full range of issues that the agents in the group can solve. In some cases, it may be difficult to identify a particular group when multiple groups have names that appear relevant to the current contact or when no group has a name that appears particularly relevant. The interface 400 shown in FIG. 4 allows a sending agent to search for a group of possible receiving agents by using a query operation based on the particular issue, rather than requiring the sending agent to know the group of possible receiving agents by name or identifier, or requiring the sending agent to look up the group of receiving agents by name or identifier.

Figure 4:
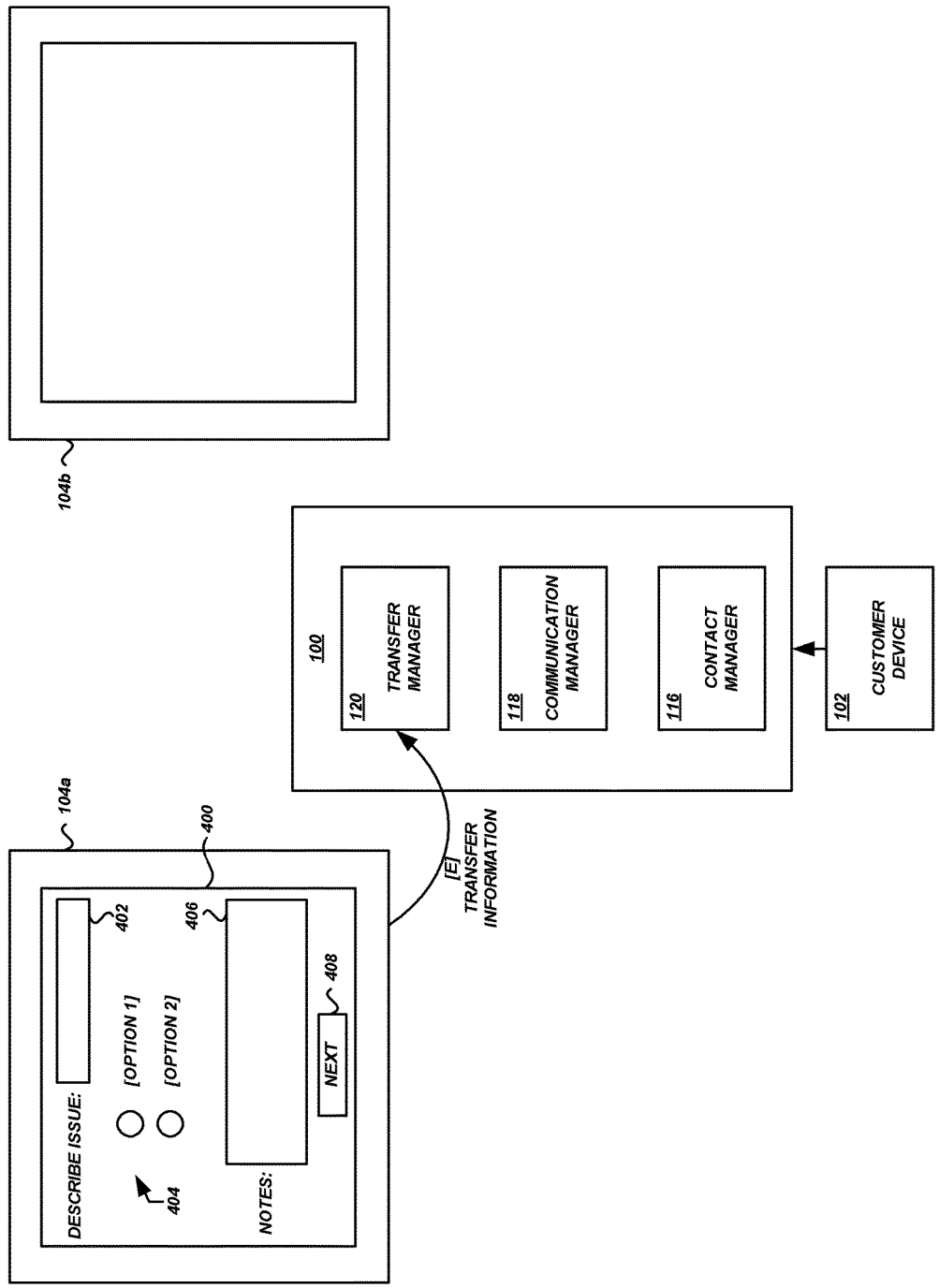
FIG. 4 is a block diagram of various data flows and interactions between components of a customer service center, a sending agent device, and a customer device during initiation of a contact transfer process according to some embodiments.

In some embodiments, as shown in FIG. 4, a sending agent may enter text into a query field 402. The transfer manager 120 may identify agents or groups of agents as candidates for transfer based on the text entered in the query field. For example, the transfer manager 120 may access a cross-reference table or list in the agents data store 114. The cross-reference list may associate words, indicative of properties of a contact, with the names or identifiers of particular agents or groups of agents. As the sending agent types into the query field 402 (or after the occurrence of some event, such as activation of an option to submit the query), the transfer manager 120 can analyze the entered text with respect to the cross-reference table and obtain the identifier or name of the agent or group of agents whose associated contact properties most closely match the terms provided by the sending agent. As another example, the transfer manager 120 may use natural language processing to process the terms entered by the sending agent in the query field and identify an agent or group of agents. Illustratively, the natural language processing may include using a set of rules or a statistical model to determine scores for each available agent or group of agents, where higher scores represent closer matches of the search terms to agent skills. The transfer manager 120 may then select the highest scoring or closest matching agent or group of agents from the set of available agents.

In some embodiments, as shown, the interface 400 may present multiple options 404, corresponding to the top-scoring or top matching agents or groups of agents. The sending agent can then make the final selection of which particular agent or group of agents will receive a transfer request. In some embodiments, the sending agent may add notes or other data to the transfer. The entered notes or other data may be presented to the potential receiving agent to help the receiving agent assess whether transfer of the contact to the receiving agent is appropriate. For example, the sending agent can type notes into an entry field 406 for the target agent or group of agents. By including the note submission feature as part of the transfer initiation process, the sending agent does not have to access other portions of the system outside of the transfer process to add the notes, thus streamlining the transfer initiation process. The sending agent may then finalize the agent/group selection and entry of notes, or otherwise proceed to the next step of the process by activating an option, such as by clicking or tapping a button 408. Information regarding the sending agent's selections can be sent to the transfer manger 120 at [E].

Returning to FIG. 2, at block 214 the transfer manager 120 or some other module or component of the customer service system 100 can select a target agent to be the receiving agent in the transfer of the contact. If the sending agent selected a target agent to be receiving agent in block 212, above, then the transfer manager 120 may finalize the selection and proceed to decision block 216. However, in some embodiments the selection by the sending agent may be a selection of a group of agents, rather than a single agent. The transfer manager 120 may select a specific agent from the group of agents to be the receiving agent in this transfer process. For example, the transfer manager may analyze the availability of the agents in the group of agents, select the next available agent from a queue, or perform some other process for selecting an individual agent. The target agent may then be prompted to accept the transfer of the contact, as shown in FIG. 5 and described below.

At decision block 216, the transfer manager 120 or some other module or component of the customer service system 100 can determine whether the receiving agent, selected or finalized above, has accepted transfer of the present contact. If so, the process 200 can proceed to block 218. Otherwise, if the receiving agent rejects the transfer or otherwise does not accept it, the process 200 may return to block 212 for the initiation of the transfer to another agent. Advantageously, the acceptance or rejection by the receiving agent of the transfer can be transparent to both agents. For example, as shown in FIG. 5, both agents may be presented with information regarding the current status of the transfer, including whether or not the receiving agent has accepted transfer of the contact from the sending agent.

Figure 5:
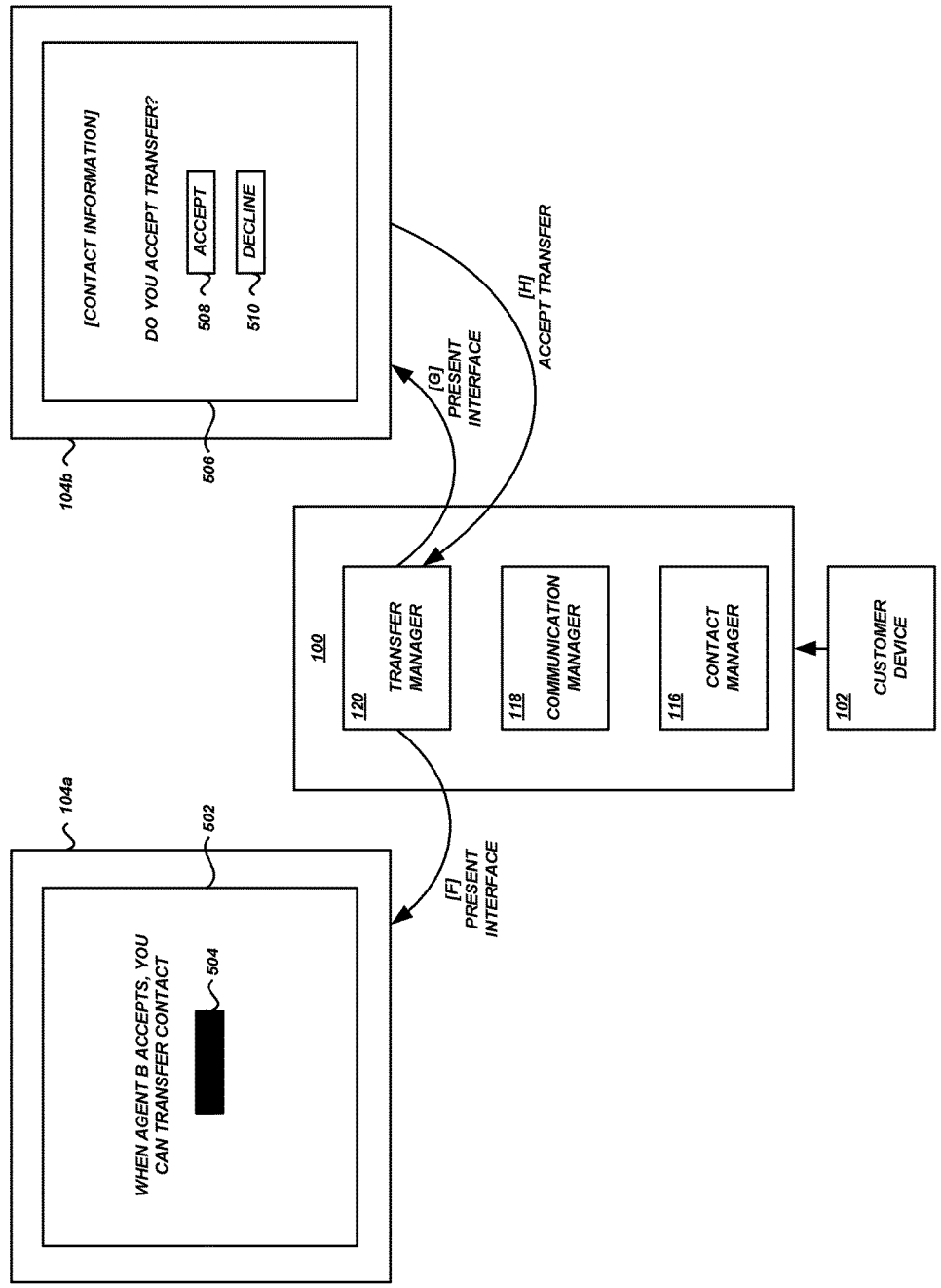
FIG. 5 is a block diagram of data flows and interactions between components of a customer service center, a sending agent device, a receiving agent device, and a customer device during a transfer process according to some embodiments.

FIG. 5 illustrates the presentation of dynamic interfaces to both the sending agent and receiving agent in order to facilitate transparency in the transfer process. The interfaces may be provided by the transfer manager 120 at [F] and [G], or may include information from the transfer manager 120 regarding the current state of the transfer process. In some embodiments, as shown, the sending agent device 104a may present an interface 502 that indicates the transfer is pending, and awaiting acceptance by the receiving agent. A user interface option 504 to complete the transfer may be presented in a disabled or de-emphasized manner, indicating that the transfer cannot yet be completed until acceptance by the receiving agent. At the same time (or substantially concurrently), the receiving agent device 104b may present an interface 506 that displays a prompt for acceptance of the transfer. One or more options may be presented to the receiving agent, such as a user interface option 508 to accept the transfer, a user interface option 510 to decline the transfer, and/or other options (e.g., an option to initiate a conversation with the sending agent to discuss the transfer, an option to access additional information about the contact or transfer, etc.). If the receiving agent activates the option 508 to accept the transfer, the receiving agent device 104b may notify the transfer manager 120 at [H].

In some embodiments, the sending agent device 104a and receiving agent device 104b may communicate the status of the transfer to each other. For example, the sending agent device 104a may generate an information packet to be maintained using secure persistence. The sending agent device 104a can generate a unique identifier for the packet, and provide (directly or indirectly) the identifier to the receiving agent device 104b. The receiving agent device 104b can then access the packet at the packet's storage location (e.g., at the customer service system 100) using the identifier to distinguish the packet from others that may be stored in the same location. Throughout the transfer process, each agent device 104a, 104b can check the packet for information regarding the transfer, and add or modify information in the packet as needed. For example, the agent devices may add information to the packet indicating that the sending agent device 104a has initiated the transfer, that the receiving agent device 104b has accepted the transfer, that the sending agent device 104a has completed the transfer, etc. The agent devices may check the packet periodically (e.g., every 1 second, every 2 second, etc.) for new information.

Returning to FIG. 2, at block 218, the transfer manager 120 or some other module or component of the customer service system 100 can enable completion of the transfer by the sending agent. For example, the transfer manager 120 may provide a new user interface to the sending agent device 104a, or instruct the sending agent device 104a to enable activation of an option to complete the transfer. While the option is enabled on the sending agent device 104a, a message may be displayed on the receiving agent device 104b that finalization of the transfer is pending until completed by the sending agent.

At decision block 220, the transfer manager 120 or some other module or component of the customer service system 100 can determine whether the sending agent has completed transfer of the contact to the receiving agent. If so, the process 200 can proceed to block 222 for transfer of communication with the customer device 102 to the receiving agent device 104b. Otherwise, if the sending agent decides not to complete the transfer, the process 200 may return to decision block 210 for determination of whether the contact has been resolved without the transfer.

At block 222, the communication manager 118 or some other module or component of the customer service system 100 can transfer communication with the customer device 102 to the receiving agent device 104b. In some embodiments, the transfer of communication may depend on the particular mode of communication being used. For example, if the communication is a phone call, then transferring communication can include re-routing a phone call from the customer device 102 so that the destination is the receiving agent device 104b rather than the sending agent device 104b. As another example, if the communication is a chat session, then transferring communication can include routing incoming messages from the customer device to the receiving agent device 104b rather than the sending agent device 104a, and enabling the receiving agent device 104b to send messages to the customer device 102.

At block 224, the transfer manager 120 or some other module or component of the customer service system 100 can transfer underlying data associations for the contact to unlock the contact from the sending agent and lock the contact to the receiving agent. In some embodiments, unlocking the contact from the sending agent and locking the contact to the receiving agent can include updating information in the contacts data store 110 and/or agents data store 114. For example, data indicating that post-contact processes (e.g., follow-ups, reporting, etc.) must be performed by the sending agent can be modified to indicate that such processes must be performed by the receiving agent. As another example, data indicating that the sending agent is unavailable to receive any additional contacts until the current contact has been resolved can be modified to indicate that the sending agent is available for new contacts.

Figure 6:
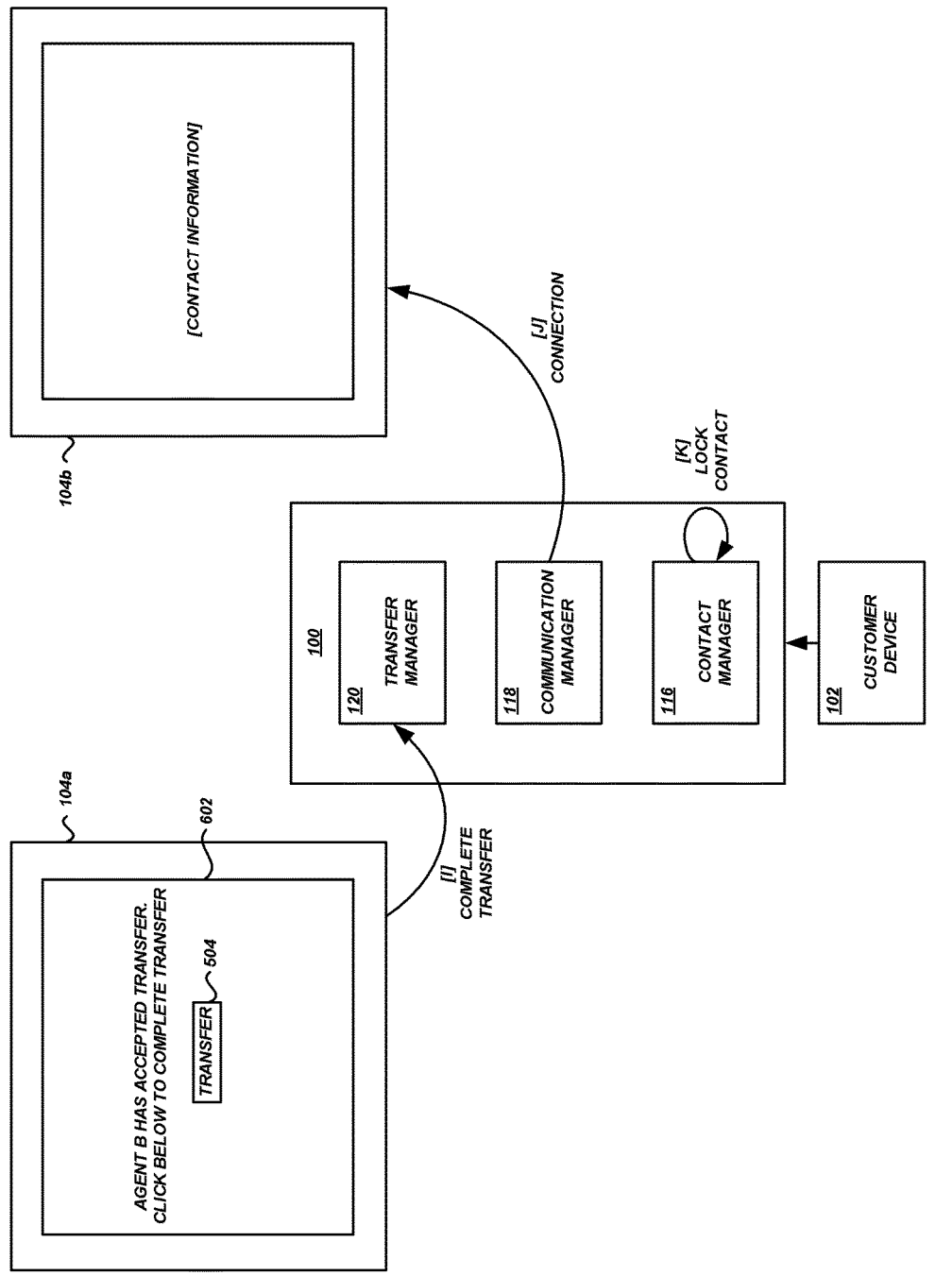
FIG. 6 is a block diagram of additional data flows and interactions between components of a customer service center, a sending agent device, a receiving agent device, and a customer device during a contact transfer process according to some embodiments.

FIG. 6 illustrates the transfer of communication and the update to underlying data associated with the contact. In some embodiments, as shown, the sending agent device 104a can present an interface 602 for the sending agent to complete the transfer. If the sending agent activates the option to complete the transfer, then the sending agent device 104a may notify the transfer module 120 at [I]. The transfer manager 120 can then instruct the communication manager 118 to transfer communication with the customer device 102 to the receiving agent device 104b, and the communication manager 118 can make the transfer at [J]. The transfer manager 120 can also instruct the contact manager 116 to unlock the contact from the sending agent, and lock it to the receiving agent. The contact manager 116 can transfer the lock at [K].

Execution Environment

Figure 7:
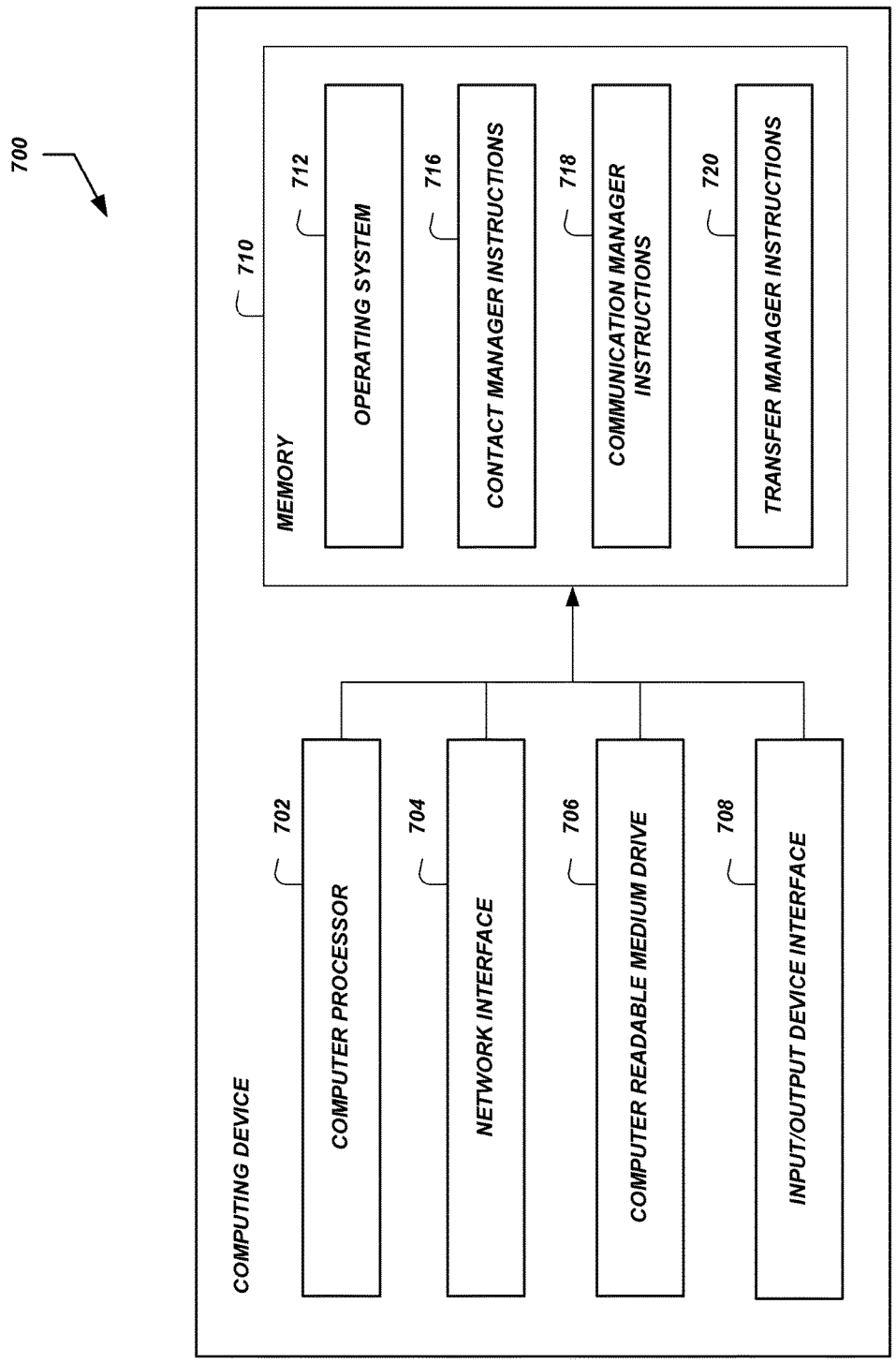
FIG. 7 is a block diagram illustrating components of a computing device configured to execute a transfer process or portions thereof according to some embodiments.

FIG. 7 illustrates the various components of an example computing device 700 configured to implement some or all of the functionality of the customer service system 100. In some embodiments, as shown, the computing device 700 may include: one or more computer processors 702, such as physical central processing units ("CPUs"); one or more network interfaces 704, such as a network interface cards ("NICs"); one or more computer readable medium drives 706, such as a high density disk ("HDDs"), solid state drives ("SDDs"), flash drives, and/or other persistent non-transitory computer-readable media; an input/output device interface 708, such as an IO interface in communication with one or more microphones; and one or more computer readable memories 710, such as random access memory ("RAM") and/or other volatile non-transitory computer-readable media.

The computer readable memory 710 may include computer program instructions that one or more computer processors 702 executes in order to implement one or more embodiments. The computer readable memory 710 can store an operating system 712 that provides computer program instructions for use by the computer processor(s) 702 in the general administration and operation of the computing device 700. In some embodiments, the computer readable memory 710 can further include computer program instructions and other information for implementing aspects of the present disclosure. For example, in one embodiment, the computer-readable memory 710 may include contact manager instructions 716 for implementing features of the contact manager, communication manager instructions 718 for implementing features of the communication manager 118, and/or transfer manager instructions 720 for implementing features of the transfer manager 120.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   computer-readable memory storing executable instructions; and
   one or more processors in communication with the computer-readable memory and configured by the executable instructions to at least:
   connect a telephone call from a customer device to a first agent device;
   generate data representing a customer contact associated with the telephone call, wherein the data representing the customer contact indicates a post-contact process is assigned to a first agent using the first agent device;
   receive, from the first agent device, a search term representing an aspect of the customer contact;
   select a second agent based at least partly on a correspondence of the search term with data representing an expertise of the second agent;
   cause presentation, by the first agent device, of a first user interface indicating that transfer of the customer contact is pending until acceptance by the second agent;
   cause presentation, by a second agent device associated with the second agent, of a second user interface for accepting transfer of the customer contact, wherein the second agent device presents the second user interface concurrently with the first agent device presenting the first user interface;
   receive, from the second agent device, data representing acceptance of transfer of the customer contact;
   cause presentation, by the first agent device, of a third user interface indicating that transfer of the customer contact has been accepted;
   transfer the telephone call from the customer device to the second agent device; and
   modify the data representing a customer contact to indicate that the post-contact process is assigned to the second agent.

2. The system of claim 1, wherein the one or more processors are configured to execute the executable instructions to (1) cause presentation of the third user interface, (2) transfer the telephone call, and (3) modify the data representing the customer contact, all in response to receipt of the data representing the acceptance of transfer of the customer contact.

3. The system of claim 1, wherein the one or more processors are further configured by the executable instructions to at least prevent assignment of a second customer contact to the first agent until the customer contact is not assigned to the first agent.

4. The system of claim 1, wherein the one or more processors are further configured by the executable instructions to at least:
   receive, from the first agent device, a packet of information regarding transfer of the customer contact;
   receive, from the second agent device, a modification to the information regarding transfer of the customer contact; and
   update the packet to reflect the modification.

5. A computer-implemented method comprising:
   as performed by a computing system configured to execute specific instructions,
     establishing a communication session with a first computing device;
     causing presentation, by the first computing device, of a first message indicating that transfer of the communication session to a second computing device is pending;
     causing presentation, by the second computing device, of a user interface option to accept transfer of the communication session to the second computing device, wherein the second computing device presents the user interface option concurrently with the first computing device presenting the first message; and in response to activation of the user interface option to accept transfer of the communication session:

transferring the communication session to the second computing device; and causing presentation, by the first computing device, of a second message indicating that the communication session has been transferred to the second computing device.

6. The computer implemented method of claim 5, wherein causing presentation of the first message further comprises causing presentation of information indicating that the transfer of the communication session to the second computing device is pending until receipt of an indication of approval from the second computing device regarding the transfer.

7. The computer implemented method of claim 5, further comprising:

receiving, from the first computing device, a request to transfer the communication session; and determining that the communication session is to be transferred to the second computing device based at least partly on an expertise of a user of the second computing device.

8. The computer implemented method of claim 5, further comprising preventing establishment of a second communication session to the first computing device prior to transfer of the communication session from the first computing device.

9. The computer-implemented method of claim 5, further comprising:

receiving, from the first computing device, a packet of information regarding transfer of the communication session;

receiving, from the second computing device, a modification to the information regarding transfer of the communication session; and updating the packet to reflect the modification.

10. The computer-implemented method of claim 9, further comprising receiving, from the first computing device, requests to access the packet on a periodic basis.

11. The computer-implemented method of claim 5, further comprising storing data regarding a customer contact, wherein the communication session is associated with the customer contact, and wherein the data regarding the customer contact associates the customer contact with a first user of the first computing device.

12. The computer-implemented method of claim 5, wherein transferring the communication session comprises transferring at least one of: a telephone call or an instant message conversation.

13. The computer-implemented method of claim 5, further comprising:

receiving, from the first computing device, information regarding a customer contact associated with the communication session; and causing presentation, by the second computing device, of at least a portion of the information regarding the customer contact in a user interface, wherein the user interface comprises the user interface option to accept transfer of the communication session.

14. A non-transitory computer storage medium storing executable code, wherein the executable code configures a computing system to perform a process comprising:

establishing a communication session with a first computing device;

causing presentation, by the first computing device, of a first message indicating that transfer of the communication session to a second computing device is pending;

causing presentation, by the second computing device, of a user interface option to accept transfer of the communication session to the second computing device, wherein the second computing device presents the user interface option concurrently with the first computing device presenting the first message; and in response to activation of the user interface option to accept transfer of the communication session:

transferring the communication session to the second computing device; and causing presentation, by the first computing device, of a second message indicating that the communication session has been transferred to the second computing device.

15. The non-transitory computer storage medium of claim 14, wherein causing presentation of the first message further comprises causing presentation of information indicating that the transfer of the communication session to the second computing device is pending until receipt of an indication of approval from the second computing device regarding the transfer.

16. The non-transitory computer storage medium of claim 14, wherein the process further comprises:

receiving, from the first computing device, a request to transfer the communication session; and determining that the communication session is to be transferred to the second computing device based at least partly on an expertise of a user of the second computing device.

17. The non-transitory computer storage medium of claim 14, wherein the process further comprises preventing establishment of a second communication session to the first computing device prior to transfer of the communication session from the first computing device.

18. The non-transitory computer storage medium of claim 14, wherein the process further comprises:

receiving, from the first computing device, a packet of information regarding transfer of the communication session;

receiving, from the second computing device, a modification to the information regarding transfer of the communication session;

updating the packet to reflect the modification; and receiving, from the first computing device, requests to access the packet on a periodic basis.

19. The non-transitory computer storage medium of claim 14, wherein the process further comprises storing data regarding a customer contact, wherein the communication session is associated with the customer contact, and wherein the data regarding the customer contact associates the customer contact with a first user of the first computing device.

20. The non-transitory computer storage medium of claim 14, wherein transferring the communication session comprises transferring at least one of: a telephone call or an instant message conversation.

* * * * *